(12) United States Patent
Haimer (10) Patent No.: US 7,062,847 B2
(45) Date of Patent: Jun. 20, 2006

(54) SHRINKING ARRANGEMENT FOR A TOOL HOLDER

(75) Inventor: Franz Haimer, Hollenbach-Igenhausen (DE)

(73) Assignee: Franz Haimer Maschinenbau KG, Hollenbach-Iqenhausen (DE)

( * ) Notice: Subject to any disclaimer, the term of this patent is extended or adjusted under 35 U.S.C. 154(b) by 304 days.

(21) Appl. No.: 10/291,571

(22) Filed: Nov. 12, 2002

(65) Prior Publication Data

US 2003/0088972 A1 May 15, 2003

(30) Foreign Application Priority Data

Nov. 12, 2001 (DE) ................ 101 55 439
May 17, 2002 (DE) ................ 102 22 092

(51) Int. Cl.
*B23P 11/02* (2006.01)

(52) U.S. Cl. ............... 29/800; 29/447; 279/143; 408/239 R; 409/232; 409/234

(58) Field of Classification Search ............ 29/447, 29/800; 403/273; 279/143; 408/239 R; 409/232, 234
See application file for complete search history.

(56) References Cited

U.S. PATENT DOCUMENTS

| | | | | |
|---|---|---|---|---|
| 5,280,671 A | * | 1/1994 | Marquart ............... | 29/447 |
| 6,629,480 B1 | * | 10/2003 | Freyermuth et al. ...... | 82/118 |
| 6,722,008 B1 | * | 4/2004 | Flick ................ | 29/281.5 |
| 6,755,228 B1 | * | 6/2004 | Kelch ................ | 156/499 |
| 6,857,177 B1 | * | 2/2005 | Taylor ............... | 29/447 |
| 2001/0024020 A1 | * | 9/2001 | Rabe ................. | 279/158 |
| 2003/0057202 A1 | * | 3/2003 | Maxson .............. | 219/635 |
| 2003/0070286 A1 | * | 4/2003 | Chalmers et al. ....... | 29/800 |
| 2003/0088972 A1 | * | 5/2003 | Haimer .............. | 29/700 |
| 2004/0080089 A1 | * | 4/2004 | Haimer et al. ......... | 269/58 |
| 2004/0111855 A1 | * | 6/2004 | Pfau ................. | 29/407.04 |

FOREIGN PATENT DOCUMENTS

| | | |
|---|---|---|
| DE | 199 61 451 A1 | 6/2001 |
| DE | 100 15 074 C | 8/2001 |
| DE | 100 15 322 A1 | 10/2001 |

(Continued)

*Primary Examiner*—David P. Bryant
(74) *Attorney, Agent, or Firm*—Rothwell Figg Ernst & Manbeck (57) ABSTRACT

A shrinking arrangement for a tool holder (12) which retains a rotary tool (10) with a press fit in a central accommodating opening (20) comprises an accommodating unit (24) for accommodating the tool holder and a temperature-controlling arrangement (46, 64) at least for the thermal expansion, in particular also for subsequent cooling, of the tool holder in the region of the accommodating opening. According to the invention, the accommodating unit is arranged on a carriage (32) which is guided such that it can be displaced in the longitudinal direction of the rails of a rail system (30), which runs parallel to the axis (16) of the tool holder accommodated in the accommodating unit and is fastened on a supporting base (28), and it being possible for said carriage to be moved along its displacement path into at least one region of action of the temperature-controlling arrangement. It is preferably the case, furthermore, that a positioning/mounting unit (36) which retains the tool (10) in a radial position relative to the tool holder (12) is arranged on a further carriage (34), which is guided such that it can be displaced in the longitudinal direction of the rails of the rail system (30) independently of the first-mentioned carriage (32).

9 Claims, 4 Drawing Sheets

FOREIGN PATENT DOCUMENTS

| | | |
|---|---|---|
| EP | 1 103 338 A1 | 5/2001 |
| EP | 1 155 765 A1 | 11/2001 |
| WO | WO 99 12699 A | 3/1999 |
| WO | WO 00/45983 | 8/2000 |
| WO | WO 02 18093 A | 3/2002 |
| WO | WO 03/002298 A1 | 1/2003 |

* cited by examiner

SHRINKING ARRANGEMENT FOR A TOOL HOLDER

The invention relates to a shrinking arrangement for a tool holder which retains a rotary tool with a press fit in a central accommodating opening.

In order to clamp a rotary tool, for example a drill bit, a milling cutter or a grinding tool, in a tool holder, it is known for the tool holder to be shrink-fitted onto the tool shank by way of a sleeve section which provides an accommodating opening for the shank of the tool. This is thus done, in particular, with very high-speed machine tools, i.e. machine tools with speeds of from 10,000 to 20,000 rpm or even more, since the shrinking technology allows the tool to be clamped in with extremely precise concentricity and thus with a low level of unbalance. During the shrink-fitting procedure, the region of the accommodating opening of the tool holder is first of all heated, usually to a few 100 degrees Celsius, for example from 250 to 350 degrees, with the result that the tool can be inserted, by way of its shank, into the thus widened accommodating opening. During cooling, the sleeve section contracts again, as a result of which the accommodating opening narrows again. The nominal diameter of the accommodating opening is always selected to be somewhat smaller than the shank diameter of the tool, with the result that, following cooling, the tool is retained with a press fit, in a rotationally fixed manner, in the tool holder.

A possible example of the heat source used for heating the sleeve section is a gas flame or an electrical resistance-heating collar which can be brought into abutment contact with the tool holder. Inductive heating arrangements with an induction coil, which is supplied with alternating current or pulsed direct current and is positioned centrally on that region of the tool holder which is to be heated, have become common. Such inductive heating arrangements have the advantage that the heating-up phase can be kept very short and the heating operation can take place in a contactless manner, that it to say the induction coil need not be in contact with the tool holder.

It has likewise become common to subject the tool holder to forced cooling following the heating phase, in order to accelerate the cooling phase. It is thus known to use air-cooled, but in particular liquid-cooled, cooling collars which are positioned in contact with the sleeve section of the tool holder. Modern cooling collars may thus achieve cooling phases lasting a matter of seconds, for example less than 10 or 20 seconds, following which an operator can grasp the tool holder with bare hands without running the risk of sustaining burns.

In the case of the shrinking-arrangement concepts which have been known up until now, the tool holder can be inserted into an accommodating unit which is usually retained in a stationary manner during the shrink-fitting operations. In the case of the concepts which have been known up until now, all the heating and cooling elements (or temperature-controlling elements in general) are moved in the direction of the stationary accommodating unit and are moved away again following use. Induction coils here are frequently fitted on columns or rails, on which they are guided such that they can be displaced in the direction of the axis of the tool holder retained in the accommodating unit, with the result that they can be moved precisely over the tool holder and then moved away again. It is usually even the case that cooling elements have to be carried back and forth by hand between the tool holder and a storing station. In addition, measuring systems by means of which the tool and/or the tool holder can be measured for pre-setting purposes generally have components, such as a camera or other position-sensing elements, which are guided in an axially adjustable manner on a column or rail and, in the context of the preparations for the shrink-fitting procedure, are displaced axially relative to the accommodating unit.

In contrast, the invention proposes a shrinking arrangement for a tool holder which retains a rotary tool with a press fit in a central accommodating opening, having an accommodating unit for accommodating the tool holder and a temperature-controlling arrangement at least for the thermal expansion, in particular also for subsequent cooling, of the tool holder in the region of the accommodating opening, it being provided according to the invention that the accommodating unit is arranged on a carriage which is guided such that it can be displaced in the longitudinal direction of the rails of a rail system, which runs parallel to the axis of the tool holder accommodated in the accommodating unit and is fastened on a supporting base, and it being possible for said carriage to be moved along its displacement path into a region of action of the temperature-controlling arrangement.

The solution according to the invention makes it possible for the accommodating unit to be displaced in the direction of the axis of the tool holder retained therein. On the rail system, the carriage bearing the accommodating unit can be moved into at least one axial position at which the temperature-controlling arrangement can act with a temperature-controlling effect on the tool holder retained in the accommodating unit, that is to say can heat and/or cool the same. Once temperature control has taken place, the carriage together with the accommodating unit and the tool holder can be moved out of the region of action of the temperature-controlling arrangement again. During the shrinking process, it is thus possible to avoid axial movements of the temperature-controlling arrangement; the latter can remain in an axially stationary position during the shrinking process. It has been found overall that the concept according to the invention of the axially displaceable accommodating units makes it possible to reduce the number of components in a shrinking arrangement which have to be moved axially within the context of preparing and carrying out a shrinking process (axially here always refers to the direction of the axis of the tool holder retained in the accommodating unit, equivalent to the longitudinal direction of the rails). At the same time, this makes it possible, if desired, for more components of a shrinking arrangement than has been the case hitherto to be mounted in an axially fixed manner on the supporting base, and thus for the outlay for design, mounting and operational control of the shrinking arrangement to be reduced, although (and this should be expressly emphasized) the solution according to the invention does not in any way imply that these components, for example the temperature-controlling arrangement, actually have to be fitted in an axially stationary position on the supporting base.

It is possible, in principle, for the temperature-controlling arrangement to heat and cool the tool holder along the rail system at the same axial position of the carriage, it thus not being necessary for the carriage to be moved into an axial position for cooling the tool holder which differs from the axial position for heating the tool holder. In the case of other versions, however, it is possible for the carriage to be moved successively, along its displacement path on the rail system, to a first axial position for heating the tool holder and, at a distance therefrom, to a second axial position for cooling the tool holder.

In the case of a preferred development of the invention, the temperature-controlling arrangement comprises at least one temperature-controlling unit which is arranged on the supporting base in a manner in which it is guided such that it can be adjusted transversely, in particular in an orthogonal plane to the longitudinal direction of the rails, between at least one advanced position, in which the temperature-controlling unit has been moved into the displacement path of the carriage and a temperature-controlling element of the temperature-controlling unit is, or can be, moved into an active position in which the tool holder can move into a through-passage opening of the temperature-controlling element, and a drawn-back position, in which the temperature-controlling unit has been moved out of the displacement path of the carriage. This configuration allows a large amount of freedom in selecting where to arrange the temperature-controlling arrangement along the rail system. In particular the temperature-controlling arrangement may be arranged at any desired location between the ends of the displacement path of the carriage, for example more or less in the centre. It is nevertheless possible for the entire displacement path of the carriage to be utilized, since it is possible for the temperature-controlling unit only to be moved into the displacement path of the carriage if required but otherwise to be retained outside the displacement path of the carriage, with the result that the carriage can then pass through the axial region of the temperature-controlling unit without obstruction.

The temperature-controlling unit preferably has an induction coil which, for heating purposes, encloses the region of the accommodating opening of the tool holder in an annular manner, at a radial distance therefrom. Heating elements operating in accordance with other methods, nevertheless, are not ruled out, for example an electrical resistance-heating collar or heating collars through which a heat transfer medium, for example, oil, can flow.

A temperature-controlling element used for cooling purposes preferably has a cooling collar through which liquid coolant can flow and which can be positioned on the tool holder, in contact therewith, for cooling purposes. Other cooling elements, for example air-cooled cooling rings, are likewise conceivable. It is always the case, however, that cooling collars through which a liquid coolant flows and which can be positioned on the tool holder, in contact therewith, are preferred, since the cooling capacity of such cooling collars through which liquid coolant flows is considerably greater than the cooling capacity of air-cooled cooling rings. The liquid coolant may be water. The liquid coolant expediently flows through a closed coolant circuit between the cooling collar and a cooling subassembly which cools the heated liquid coolant again. The cooling subassembly may be a refrigerating machine operating in accordance with the heat-pump principle. The refrigerating machine may be connected to the liquid-coolant circuit via a heat exchanger, which has the advantage that the coolants flowing through the cooling collar, on the one hand, and within the refrigerating machine, on the other hand, may differ from one another.

It has also proven expedient, however, if the coolant circuit containing the cooling collar is designed as a heat-pump circuit, in the case of which the cooling collar directly forms an evaporator element of the heat-pump circuit of the refrigerating machine. Such a configuration does away with the additional heat exchanger between the refrigerating machine and cooling collar, with the result that the cooling subassembly may be of very small and cost-effective construction overall. The idea of utilizing the cooling collar directly as an evaporator element of a heat-pump circuit can also be utilized for shrinking arrangements other than the shrinking arrangement explained above, for example for shrinking apparatuses as are described, for example, in international application WO 01/89758A1, which had an earlier priority but was published at a later date. In this respect, this idea has independent inventive importance for a shrinking apparatus, in particular an inductive shrinking apparatus with a cooling collar connected to a coolant circuit.

It is possible to use temperature-controlling elements which serve either exclusively for cooling or exclusively for heating the tool holder. It is also conceivable, however, to use temperature-controlling elements which can be operated optionally for cooling or heating purposes. Moreover, the idea in respect of which, in a shrinking arrangement for a tool holder which retains a rotary tool with a press fit in a central accommodating opening, a temperature-controlling arrangement which serves for the thermal expansion and subsequent cooling of the tool holder in the region of the accommodating opening of the same is to be configured such that a temperature-controlling element of the temperature-controlling arrangement, said element enclosing the region of the accommodating opening of the tool holder in an annular manner for the temperature-controlling purposes, can be operated optionally for cooling or heating purposes has independent importance attached to it, independently of the accommodating unit being fitted on an axially displaceable carriage. We expressly reserve the right to formulate an independent set of claims directed at this idea.

A temperature-controlling element which can be operated optionally for cooling or heating purposes could be designed, for example, as a temperature-controlling collar through which water or some other liquid coolant can flow and in which an induction coil is installed.

The temperature-controlling collar is positioned on the region of the accommodating opening of the tool holder both for heating and for cooling purposes. During the cooling phase here, surface contact is produced between the temperature-controlling collar and the tool holder, and this results in a cooling effect as in the case of common cooling collars. During the heating phase, however, the temperature-controlling collar is retained at a radial distance from the outer circumferential casing of the tool holder, with the result that, rather than the tool holder being subjected to cooling action, it is only the energized induction coil which is cooled by the coolant contained in the temperature-controlling collar. This may be advantageous in so far as the temperature-dependent specific resistance of the wire material used for the induction coil can thus be kept low as the induction coil is energized. Since commercially available tool holders are frequently of slightly conical shape in the region of their accommodating opening, a slight relative displacement between the tool holder and temperature-controlling collar may be sufficient in order to produce or eliminate the contact between the temperature-controlling collar and the tool holder.

Another temperature-controlling element which can be operated for both cooling and heating purposes could be formed, for example, by a temperature-controlling collar which can be positioned on the region of the accommodating opening of the tool holder, in contact therewith and through which it is optionally possible for a liquid heat transfer medium, for example hot oil, or a cooling medium, for example cold oil, to flow. Such a temperature-controlling collar is kept in contact with the tool holder both for heating and for cooling the tool holder; it is merely the case that differently temperature-controlled liquids are introduced into the temperature-controlling collar for heating and cooling purposes.

The temperature-controlling unit may be fitted on the supporting base in a stationary manner in the longitudinal direction of the rails. Occasionally, however, it may be desirable for the temperature-controlling unit to be arranged on the supporting base such that it can be adjusted, but also arrested, in the longitudinal direction of the rails.

In order for the temperature-controlling unit, when not in use, to be protected against unintended mechanical action in the form of knocks or impact and against the action of dirt and dust, it is advantageous if, in its drawn-back position, the temperature-controlling unit is retracted in a protected manner into an accommodating space, from which it can be extended in order to reach its advanced position.

The temperature-controlling unit can be guided such that it can be moved linearly, but also pivoted, at least in part between its drawn-back position and its advanced position. It is possible for it to be fitted, or to be capable of being fitted, with a single temperature-controlling element which can be adapted, if desired, to the size of the tool holder. Alternatively, it is possible for it to be fitted, or to be capable of being fitted, with a plurality of temperature-controlling elements which can optionally be moved individually in each case into the active position relative to the tool holder. This allows the range of use of the shrinking arrangement to be increased by use being made of temperature-controlling elements which are coordinated with different tool holders. In the latter case, the temperature-controlling unit may comprise a turret plate which is retained such that it can be rotated about its plate axis and on which the temperature-controlling elements are distributed in the circumferential direction. This turret plate may, for its part, be fitted on a pivoting arm such that it can be pivoted in and out of the displacement path of the carriage. A conceivable variant to this could consist in fitting a linearly guided slide with a plurality of temperature-controlling elements arranged in a row.

It is recommended for the temperature-controlling element to be arranged on the temperature-controlling unit such that it can be exchanged for operational purposes. The temperature-controlling element can then easily be exchanged if it should become damaged or functionally incapable.

According to a preferred development, the temperature-controlling arrangement may comprise a plurality of at least two temperature-controlling units which are guided such that they can be adjusted independently of one another. These temperature-controlling units may be arranged, at least in part, one behind the other in the longitudinal direction of the rails. It is also possible, however, for at least some of the temperature-controlling units to be arranged opposite one another in the direction transverse to the longitudinal direction of the rails.

In the case of one embodiment, the temperature-controlling arrangement may then comprise two groups of temperature-controlling units which are arranged one behind the other, adjacent in each case, in the longitudinal direction of the rails and are, or can be, fitted in each case with a single temperature-controlling element, the temperature-controlling elements of one group all serving for cooling the tool holder and the temperature-controlling elements of the other group all serving for heating the tool holder.

In the case of another embodiment, the temperature-controlling arrangement may comprise two temperature-controlling units, of which each is, or can be, fitted with a plurality of temperature-controlling elements which can optionally be moved individually in each case into the active position relative to the tool holder, the temperature-controlling elements of one temperature-controlling unit all serving for cooling the tool holder and the temperature-controlling elements of the other temperature-controlling unit all serving for heating the tool holder.

The solution according to the invention is suitable for horizontal solutions, in the case of which the rail system is fastened on the supporting base with the longitudinal direction of the rails essentially parallel to the horizontal, and also for vertical solutions, in the case of which the rail system is fastened on the supporting base with the longitudinal direction of the rails essentially parallel to the vertical. Of course, it is also conceivable for the rail system to be fastened on the supporting base with the longitudinal direction of the rails running obliquely in relation to the horizontal, in particular at a small acute angle thereto.

The shrinking arrangement according to the invention may be configured, in principle, without a specific mount for the tool, with the result that the tool has to be inserted manually, by an operator, into the thermally expanded accommodating opening of the tool holder. Since, however, there is a risk here of the operator sustaining painful burns on the heated material of the tool holder, a preferred embodiment of the invention provides a positioning/mounting unit which retains the tool in a radial position relative to the accommodating opening of the tool holder in order for it to be introduced into said opening. The positioning/mounting unit ensures that the tool shank penetrates reliably and securely into the accommodating opening of the tool holder when the accommodating unit with the tool holder and the positioning/mounting unit with the tool are moved relative to one another.

In order for the accommodating unit and the positioning/mounting unit to move towards one another, it is then possible for the carriage bearing the accommodating unit to be capable of being moved right up to the positioning/mounting unit; in this case, the positioning/mounting unit may be arranged in a stationary manner in the longitudinal direction of the rails. It is also possible, however, for the positioning/mounting unit to be arranged on a further carriage, which is guided such that it can be displaced in the longitudinal direction of the rails of the rail system and, in order for the tool to be introduced into the accommodating opening of the tool holder, can be moved relative to the first-mentioned carriage, in the direction of the latter. By virtue of providing two carriages which can be displaced independently of one another, it is possible for the shrink-fitting operations to be accelerated to a not inconsiderable extent since the paths which have to be covered overall during a shrinking process can be divided up between two carriages instead of having to be covered by a single carriage.

At least one guide rail of the rail system expediently serves for guiding the two carriages together. This simplifies the design of the shrinking arrangement.

If the positioning/mounting unit can be adjusted in at least one axis-normal direction, straightforward adaptation of the positioning/mounting unit to different tool diameters is possible. It is possible to compensate for any remaining alignment errors between the tool holder and tool in that the positioning/mounting unit is fitted on the second-mentioned carriage with radial clearance of motion.

With the rail system running horizontally or inclined obliquely in relation to the horizontal, a solution of particularly straightforward design may be achieved in that the positioning/mounting unit has a positioning channel which is open at the top, runs in the longitudinal direction of the rails and in which the tool can be positioned. A prismatic shape of the positioning channel here allows precise radial positioning of the tool. In order for it also to be possible for the tool positioned in the positioning channel to be oriented axially, the positioning channel may be assigned a stop surface for positioning the tool axially.

If it is not sufficient or possible for the tool to be positioned loosely in a positioning channel, for example because there is a risk of vibration or because the shrinking arrangement is configured as a vertical unit, the positioning/mounting unit may comprise clamping means for clamping the tool in radially. The clamping means here may comprise an arrangement of clamping jaws which can be moved relative to one another and between which the tool can be clamped in. At least one of the clamping jaws here may be designed as a clamping prism. It is also possible, however, to use differently shaped clamping jaws, for example rounded jaws. In addition, the clamping means need not have any clamping jaws; instead they may have, for example, an elastically widenable, for example expandable retaining sleeve which can retain the tool in a radial position.

According to a development of the shrinking arrangement according to the invention, it is possible, on the first-mentioned carriage, for a spindle, which is arranged with its spindle axis equiaxial in relation to the tool holder accommodated in the accommodating unit and is, or can be, connected in a rotationally fixed manner to the accommodating unit at one of its ends, to be mounted such that it can be rotated about its spindle axis, the first-mentioned carriage, furthermore, bearing a drive motor for driving the spindle in rotation, and the accommodating unit being designed for clamping the tool holder in in a rotationally fixed manner. A sensor arrangement arranged on the first-mentioned carriage makes it possible here to sense unbalance forces which act on the spindle as it rotates. It is thus possible to integrate functions of a balancing machine in the shrinking arrangement and to offer a combined balancing/shrinking machine at favourable prices.

Some tool holders have an axially adjustable stop screw for the tool, said screw being arranged centrally in the accommodating opening. This stop screw makes it possible to set the depth to which the tool shank penetrates in the accommodating opening of the tool holder and thus the overall length of the unit comprising the tool holder and tool clamped therein, said overall length being important for the control of NC machine tools. The drive motor by means of which the spindle can be driven may then advantageously also be utilized for pre-setting the stop screw. This is because if there is fitted on the supporting base a retaining structure, which retains a screwing-action tool in a radially oriented manner in relation to the stop screw, it is sufficient, once the screwing-action tool and the stop screw have been brought into engagement, for the tool holder to be rotated, by corresponding activation of the drive motor, in order to adjust the stop screw. Such a motor-driven adjustment allows the stop screw to be adjusted very precisely, which is an increasingly frequent requirement of the users of the tools and tool holders. Furthermore, this opens up the possibility of automated pre-setting of the stop screw, as a result of which the operating staff are relieved of this task. It goes without saying that the drive motor selected is one which can be controlled precisely both at the higher speeds required for the unbalance measurement and at the lower speeds required for the pre-setting.

Alternatively, it is also conceivable, for pre-setting the stop screw, for the screwing-action tool to be driven by means of a separate rotary drive motor, mounted on the retaining structure, and for the tool holder instead to be blocked against rotation. It goes without saying, in addition, that it is possible for a drive motor which drives the tool holder for the purpose of pre-setting the stop screw to be arranged on the first-mentioned carriage even if there is no sensor arrangement for unbalance measurement.

The retaining structure preferably comprises a movement guide by means of which the screwing-action tool can be moved transversely, in particular in an orthogonal plane to the longitudinal direction of the rails, in and out of the displacement path of the first-mentioned carriage. For example, it is possible for the screwing-action tool to be capable of being pivoted in and out of the displacement path of the carriage on a pivoting arm, although a linear movement guide for the screwing-action tool is also readily conceivable.

It is usually sufficient if the retaining structure is fitted on the supporting base in a stationary manner in the longitudinal direction of the rails. Here too, however, the possibility of adjusting the retaining structure in the longitudinal direction of the rails is not ruled out in principle.

It is recommended for the screwing-action tool to be supported in an axially resilient manner on the retaining structure. This allows axial compensating movements of the screwing-action tool if the stop screw is displaced axially during its adjustment. Shock absorption is possible, in addition, if the screwing-action tool and the stop screw come into contact with one another.

The shrinking arrangement according to the invention preferably has an in particular optical position-sensing device which is arranged on the supporting base and is intended for carrying out position-sensing tasks at least on the tool retained in the positioning/mounting unit. Such positioning-sensing tasks arise, for example, when the tool is inserted into the positioning/mounting unit and the axial position of the tool relative to the positioning/mounting unit and/or the length of the tool are to be determined. The position-sensing device may be stationary in the longitudinal direction of the rails, but it is also alternatively possible for components of the position-sensing device to be fitted in a displaceable manner on the supporting base.

The first-mentioned carriage will expediently be assigned linear drive means, which can drive it in the longitudinal direction of the rails. The second-mentioned carriage will also advantageously be assigned linear drive means, which can drive it in the longitudinal direction of the rails independently of the first-mentioned carriage.

Users of the shrinking arrangement according to the invention may express the wish to be able to carry out the shrinking operation fully automatically, in the case of which the operating staff are relieved as far as possible of the task of carrying out manual operating work. For this purpose, an automatic feeding and removal system may be provided at least for the tool holder, in particular also for the tool, this feeding and removal system being set up for transporting the tool holder, and possibly the tool, back and forth between the shrinking arrangement and a stock location. The stock location may be a store or magazine in which a multiplicity of identical and/or different tool holders and tools are kept in stock. Of course, this does not rule out the possibility of the stock location being formed by a transfer location which is located outside such a store and at which tool holders, and possibly tools, positioned there by the operating staff are picked up, and deposited, by the feeding and removal system. It is possible in particular for the feeding and removal system to comprise at least one gripping robot, other solutions for automatically feeding and removing the tool holder, and possibly the tool, of course also being conceivable.

Conventional tool holders which retain the rotary tool with a press fit define a reference position which allows the axial position of the rotary tool to be measured in a reproducible manner relative to the tool holder and thus relative to the spindle of the machine tool accommodating the tool holder. The axial reference position may be defined for example, in the case of steep-taper tool holders, by a predetermined diameter of the steep-taper holder or, in the case of hollow steep-taper tool holders, by a shoulder surface oriented towards the operating spindle. In practice, then, it is desirable for the distance between this axial reference position of the tool holder and the tip of the rotary tool remote from the holder to have a predetermined length, with the result that the setting of the machine tool does not have to be changed when a tool is changed. The attempt is thus made to shrink-fit the rotary tool into the tool holder in such an axial position that this predetermined distance between the tip of the tool and the axial reference position of the tool holder is as precise as possible following the shrink-fitting procedure. If the tool holder, as has been explained above, comprises an inner screw which projects axially into the accommodating opening and limits the depth to which the tool shank penetrates during the shrink-fitting procedure, then, with the length of the tool which is to be shrink-fitted being known, said stop screw can be preadjusted such that the desired position of the tool is ensured when it is introduced into the accommodating opening, during the shrink-fitting procedure, until it strikes against said screw. The pre-setting of the axially adjustable stop screw projecting into the accommodating opening of the tool holder can take place, by means of the screw-action tool mentioned above, prior to the thermal widening of the tool holder, but also during the heating phase.

In the case of conventional shrinking apparatuses which allow predetermined axial positioning of the tool relative to the tool holder, the desired overall length is measured during the shrink-fitting operation, that is to say at a point in time at which the tool holder is at a higher temperature for thermal-expansion purposes. The heating of the tool holder, however, changes not only the radial dimensions in the region of the accommodating opening, but also the axial dimensions, with the result that the predetermined length which is set in the heated state between the axial reference position of the tool holder and the tip of the tool is shortened in the cold state of the tool holder and thus is set incorrectly.

Although it is possible to avoid measuring errors of this type if the stop screw is set to the desired position in the cold state of the tool holder, this nevertheless requires tool holders with a setting screw. It is thus a further object of the invention to specify a shrinking arrangement which makes it possible for rotary tools to be shrink-fitted into tool holders such that they have a predetermined length between an axial reference position of the tool holder and the tip of the rotary tool even when the tool holder does not have any axially adjustable stop or axial adjustment of such a stop is not desired.

With regard to this second aspect, the invention, in turn, is based on a shrinking arrangement of the type explained in the introduction and solves the above problem in that the accommodating unit, which retains the tool holder, a positioning/mounting unit, which retains the rotary tool equiaxially in relation to the accommodating opening of the tool holder retained in the accommodating unit, and the already mentioned temperature-controlling arrangement are arranged on a supporting base such that they can be moved relative to one another in each case in the axial direction of the accommodating opening, and in that arranged on the supporting base is a setting device by means of which, with the tool holder thermally expanded, the distance between an end of the tool holder retained in the accommodating unit which is in the vicinity of the tool and that end of the rotary tool engaging in the accommodating opening which is remote from the tool holder can be set to a predetermined distance value.

Such a shrinking arrangement makes use of the fact that the axial distance between the axial reference position of the tool holder and its end surface in the vicinity of the tool is known for the cold tool holder, but at least can be measured on the cold tool holder. If, as has been proposed, the rotary tool is shrink-fitted into the tool holder such that the distance between that end surface of the tool holder which is in the vicinity of the tool and the tip of the tool has been adjusted to the abovementioned predetermined distance value, then tolerances induced by thermal expansion are eliminated. The predetermined distance value between that end surface of the tool holder which is in the vicinity of the tool and the tip of the tool is measured and/or adjusted when the tool is used in the cold state, and the desired overall length between the axial reference position of the tool holder and the tip of the tool can be gathered, free of thermal-expansion tolerances, from the length between the axial reference position of the tool holder and the end surface in the vicinity of the tool, said length being determined with the tool holder in the cold state, plus the predetermined distance value between that end surface of the tool holder which is in the vicinity of the tool and the tip of the tool. With knowledge of the desired overall length and of the distance between the axial reference position of the tool holder and its end surface in the vicinity of the tool, said distance being determined with the tool holder in the cold state, it is thus readily possible to determine the predetermined distance value which is to be set for the desired overall length.

In the case of the shrinking arrangement explained above, the rotary tool is retained in a positioning/mounting unit equiaxially in relation to the accommodating opening of the tool holder retained in the accommodating unit. However, it is also possible for the invention to be used for shrinking arrangements in which there is no such positioning/mounting unit, and the tool which is to be shrink-fitted is thus introduced, for example, by hand into the thermally expanded tool holder. The invention explained above may also be realized in such configurations, for example by the setting device having a stop for the tip of the tool, and the tool being positioned by hand against the stop set to the predetermined distance value, as long as the tool shank can be still be displaced in the thermally expanded accommodating opening of the tool holder. Here too, it is possible to achieve the advantage of thermal-expansion tolerances being eliminated in the measurement of the overall length. It goes without saying that the stop of the setting device is also adjusted by a positioning drive during the thermal-expansion phase, with the result that the manually guided tool is pushed into the tool holder by means of the setting device.

The setting device may have a position-sensing device which senses the position of that end of the tool holder which is in the vicinity of the tool and/or of that end of the rotary tool which is remote from the tool holder in relation to the respectively other end or in relation to a reference position of the accommodating unit or of the positioning/mounting unit. In other words, the position-sensing device can measure the predetermined distance value directly or determine it from two individual measurements relating to reference positions of the accommodating unit or of the positioning/mounting unit.

The setting device is expediently assigned a positioning drive which moves the accommodating unit and the positioning/mounting unit relative to one another and regulates the relative advancement of said units so as to produce the predetermined distance value.

Exemplary embodiments of the invention are explained in more detail hereinbelow with reference to the attached drawings, in which:

FIG. 4 shows, schematically, a section through a clamping mount which can be used for a shrinking apparatus according to the invention and is intended for a tool which is to be clamped in.

Figure 1:
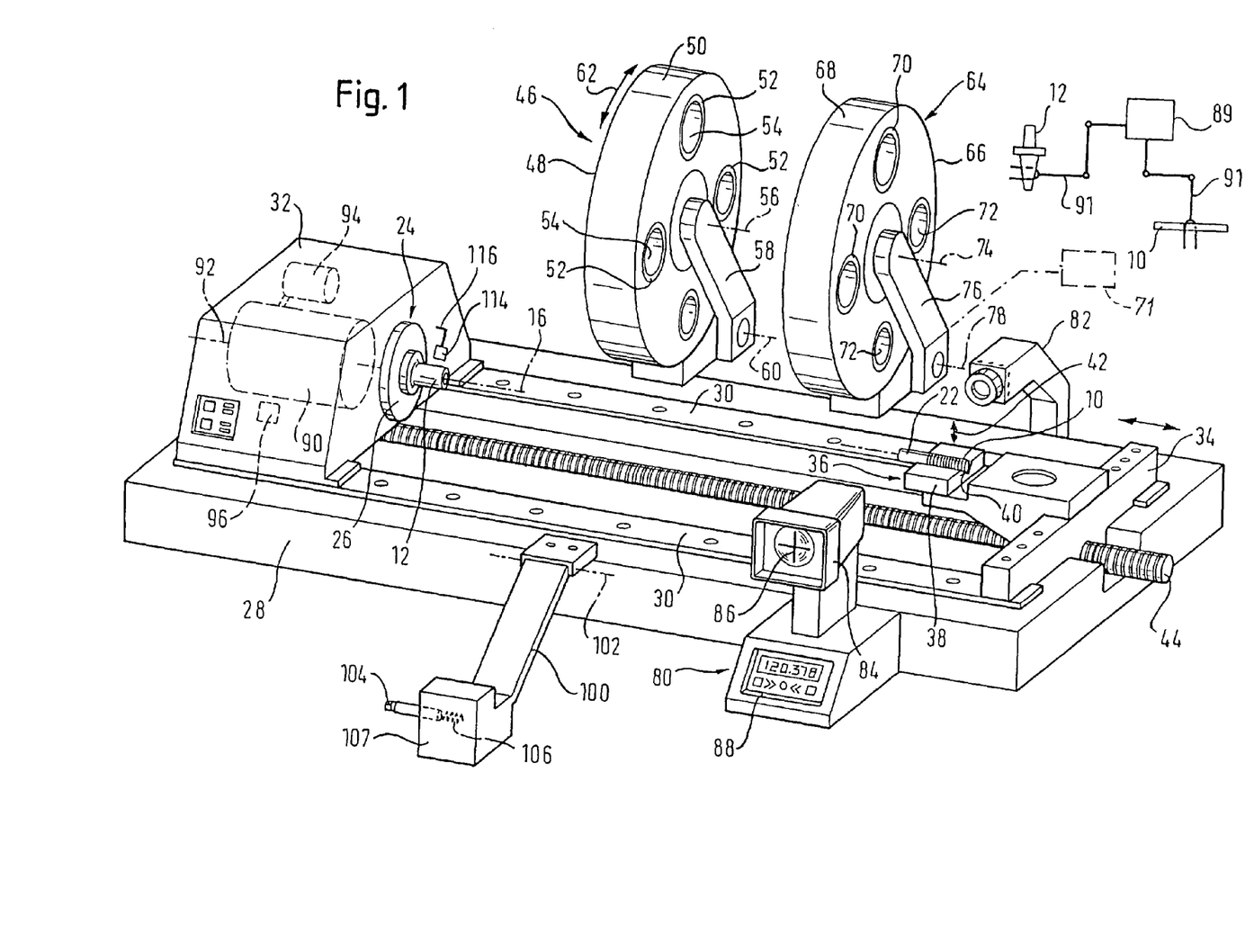
FIG. 1 shows a schematic view, in perspective, of a shrinking apparatus according to the invention which is configured as a horizontal unit and is intended for shrinkable tool holders of rotating tools.
Figure 6:
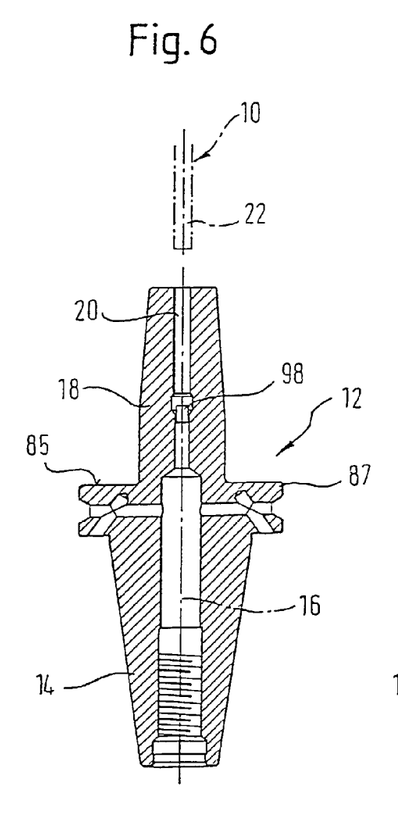
FIG. 6 shows an axial longitudinal section through an example of a tool holder which can be used in conjunction with shrinking apparatuses according to the invention.

FIG. 1 shows a shrinking apparatus which is configured as a transportable unit and by means of which a rotary tool 10, for example a drill bit or milling cutter, is clamped into a tool holder 12 and can be released therefrom. Such tool holders, one of which is shown in FIG. 6, generally have a coupling shank 14, by way of which they can be clamped centrally into a machine tool. Standard coupling shanks are, for example, in the form of a steep-taper or hollow steep-taper shank. Located opposite the coupling shank 14 in the axial direction (the tool holder axis is designated 16 in FIG. 6), the tool holders have a sleeve-like tool-accommodating region 18 with a central, essentially cylindrical accommodating opening 20 for the shank of the tool 10. The internal diameter of the accommodating opening 20 is somewhat smaller in a clamping region, which is provided for clamping the tool in, than the external diameter of the tool shank, which is designated 22 here, which results in the accommodating region 18 of the tool holder 12 first of all having to be heated before the tool 10 can be introduced, by way of its shank 22, into the thermally expanded clamping region of the accommodating opening 20. Following the cooling, when the accommodating region 18 of the tool holder 12 has contracted again, the tool 10 is seated with a press fit in the accommodating opening 20.

The shrinking apparatuses presented here are capable of heating the accommodating region 18 of the tool holder 12 to a sufficient temperature of, for example, approximately 300 degrees Celsius within a few seconds and then of ensuring in a comparably short period of time (for example in approximately 30 seconds, or considerably less in the case of forced cooling) cooling to the ambient temperature, but at least to a temperature which is low enough for the tool holder 12 to be grasped safely by the bare hand.

For the shrinking operation, the tool holder 12, in the case of the shrinking apparatus from FIG. 1, is inserted, with the axis 16 horizontal, into an accommodating unit 24, which is designated 24 in general terms and, in a manner known per se, has a schematically indicated accommodating body 26 with an opening into which the tool holder 12 can be inserted by way of its coupling shank 14. The accommodating unit 24 comprises retaining means (not illustrated specifically), for example in the form of a chuck, which keep the tool holder 12 in contact with supporting surfaces of the accommodating body 26. The accommodating body 26 is preferably configured as an adapter, which can be exchanged if required within the context of a possibly automatic quick-change system. Such an adapter solution allows the shrinking apparatus to be adapted to different types of tool holder coupling shank.

As a significant feature of the invention, the accommodating unit 24 can be displaced axially, i.e. in the direction of the axis 16 of the tool holder 12 inserted into it. In the example of FIG. 1, for this purpose, a system of two horizontal guide rails 30, which are spaced apart parallel to one another, is fastened on a base plate 28 which serves as supporting base of the shrinking apparatus, a carriage 32 which bears the accommodating unit 24 being guided such that it can be moved in the longitudinal direction of said rails. The accommodating unit 24 is fitted on the carriage 32 such that the tool holder axis 16 runs parallel to the longitudinal direction of the rails. In the simplest case, the carriage 32 may be guided with sliding action on the guide rails 30; nevertheless, guidance by means of endlessly circulating rolling-body loops retained on the carriage 32 or by means of a roller mounting is not ruled out. For straightforward production, the guide rolls 30 may be formed, for example, by cross-sectionally rectangular material strips made of metal or rigid plastic. Any other desired cross-sectional geometries of the guide rails 30 are, of course, possible. It goes without saying that, instead of the two guide rails 30, it is also possible for the rail system to have more than two rails or even just a single rail.

Independently of the first carriage 32, a further carriage 34 is guided such that it can be moved in the longitudinal direction of the guide rails 30, once again, for simplicity of design, preferably with sliding action, although rolling guidance of this second carriage 34 is, of course, likewise possible. It goes without saying that, alternatively, the two carriages 32, 34 may also be guided on separate guide rails. The second carriage 34 bears a positioning/mounting unit which is designated 36 in general terms and serves for accommodating and positioning the tool 10 which is to be clamped into the tool holder 12. In the positioning/mounting unit 36, the tool 10 is retained in a radial position in relation to the tool holder 12 such that, when the two carriages 32, 34 move towards one another, the shank 22 of said tool penetrates into the thermally expanded accommodating opening 20 of the tool holder 12.

In the example of the horizontal shrinking apparatus shown in FIG. 1, the positioning/mounting unit 36 has a supporting table 38 in which a positioning channel 40 is made in the axial direction, that is to say in the longitudinal direction of the rails. The tool 10 is positioned in this positioning channel 40 such that it projects, by way of its shank 22, beyond that edge of the supporting table 38 which is directed towards the first carriage 32. The extent by which the tool shank 10 projects beyond the supporting table 38 should at least be somewhat greater than the desired depth to which the tool shank 22 is inserted into the accommodating opening 20 of the tool holder 12. The positioning channel 40 is preferably of prismatic configuration, as can be seen with reference to the channel cross section shown in FIG. 2. By virtue of such a prism shape of the positioning channel 40, the tool 10 can be positioned securely such that it does not rock. At the same time, a supporting prism ensures that the tool 10 is centred in the horizontal radial direction irrespective of the tool diameter. Other positioning means which allow axis-parallel positioning and also fixing, such as in particular a chuck or clamping sleeve or clamping jaws, can be used as an alternative to, or also in conjunction with, the positioning channel 40.

In order for it also to be possible for the tool 10 to be oriented in the vertical radial direction in relation to the axis 16 of the tool holder 12, the supporting table 38 is height-adjustable, as indicated by a double arrow 42 in FIG. 1. The height-adjustment capability allows adaptation to different tool diameters. The height adjustment of the supporting table 38 may take place, for example, manually by an operator turning a corresponding adjusting screw. It is also possible for the supporting table 38 to be height-adjustable with the aid of an actuating drive motor. In such a case, it is conceivable for an operator to be able to switch the actuating drive on and off as desired via a corresponding operating element. It is also conceivable, however, to have fully automatic height adjustment of the supporting table 38, in the case of which the operator merely has to enter the tool diameter into an operating console of the shrinking apparatus and an electronic control unit of the shrinking apparatus controls the actuating drive in dependence thereon. It goes without saying that, as an alternative, or in addition, it is also possible for the accommodating unit 24 to be of height-adjustable design.

The two carriages 32, 34 can be driven along the guide rails 30 independently of one another, in a manner which is not illustrated specifically, by means of in each case one linear drive. A possible example of a linear drive is a spindle drive, in particular a ball screw, of which the threaded spindle is mounted in a rotatable manner on the base plate 28 and is coupled to a drive motor at one of its ends. A spindle nut which is in screw-connection engagement with the spindle here is connected in a non-rotatable manner to the relevant carriage 32 or 34. Such spindle drives are known per se; merely for illustrative purposes, a threaded spindle 44 is depicted, as part of such a spindle drive, in FIG. 1. Other drive concepts are also conceivable. It is thus possible for at least one of the linear drives to be designed, for example, as a belt drive or chain drive, in the case of which at least one flexible pulling means, which is connected in a tension-resistant manner to the relevant carriage 32 or 34, has been closed to give an endless loop and is in the form of a drive belt or of a drive chain, can be driven in circulation along the loop by means of the drive motor. Drive concepts with a linear motor are likewise conceivable.

In order to heat the accommodating region 18 of the tool holder 12, the shrinking apparatus comprises a heating arrangement which is designated 46 in general terms and, in the example of FIG. 1, has a heating unit 48 with a turret plate 50 which is fitted with a plurality of, in this case four, heating elements 52 distributed in the circumferential direction of the plate. The heating elements 52 each contain an induction coil which can be supplied, from an induction-current generator which is not illustrated specifically, with alternating current or pulsed direct current preferably of changeable frequency of between, for example, 50 Hz and a few kHz, for example 20 kHz. This excitation current induces eddy currents in the metallic material of the tool holder 12 when the tool holder 12 is introduced centrally, by way of its accommodating region 18, into the interior, designated 54, of one of the induction-heating elements 52. In this way, the accommodating region 18 of the tool holder 12 is heated inductively.

For different tool holders 12, the turret plate 50 is fitted with different induction-heating elements 52, which differ in terms of the size of their interior 54 and/or in terms of their induction coil. For an even greater range of use of the shrinking apparatus, the induction-heating elements 52 may be fitted on the turret plate 50 such that they can be exchanged, the induction-heating elements 52 expediently all having the same standard interface in relation to the turret plate 50. It is even possible for the entire turret plate 50 to be exchangeable, in order for it to be possible for the latter to be exchanged, if required, for a turret plate fitted with different induction-heating elements 52.

The turret plate 50 is fitted on a pivoting arm 58 such that it can be rotated about its plate axis indicated at 56, said pivoting arm, for its part, being fitted on the base plate 28, such that it can be pivoted about a pivot axis 60, which is parallel to the longitudinal direction of the rails, but is stationary in the longitudinal direction of the rails. On the pivoting arm 58, the turret plate 50 can be pivoted in an axis-normal plane between a drawn-back position and an advanced position as is indicated by a double arrow 62. In the drawn-back position, the turret plate 50 has been moved out of the displacement path of the first carriage 32 to the full extent, with the result that the latter can be moved past the heating unit 48. In the advanced position, the turret plate 50 has been pivoted into the displacement path of the carriage 32 to the extent where the tool holder 12 accommodated in the accommodating unit 24 is located on the circle of the induction-heating elements 52.

The turret plate 50 can be moved, by rotation about the plate axis 56, into various rotary operating positions in which, in the pivoted-forward position of the pivoting arm 58, in each case one of the induction elements 52 is aligned with the tool holder 12. By virtue of the carriage 32 being moved axially up to the heating unit 48, the tool holder 12 can then be moved, with its accommodating region 18 in front, into the interior 54 of the relevant induction-heating element 52. The turret plate 50 may be manually rotatable. It is recommended for suitable latching means to latch the turret plate 50 perceptibly in the rotary operating positions, in order to make it easier for the operator to locate these rotary positions. It is also possible, however, for the turret plate 50 to be moved into the rotary operating positions by a motor. In particular, this setting procedure can take place fully automatically by virtue of an operator entering the respective type of tool holder, or the induction coil which is to be used, via an operating console and, in response to this, an electronic control unit of the shrinking apparatus moving the turret plate 50 into the correct rotary operating position.

It is possible for the pivoting arm 58 to be capable of being pivoted manually between its advanced and its drawn-back pivoting positions, but also to be aided by a motor, it being possible to provide, on the shrinking apparatus, an operating element by means of which an operator can move the pivoting arm 58 forwards and back. It is possible in particular for the pivoting actuation of the pivoting arm 58 to take place fully automatically in accordance with a control program which runs in a central control unit and controls all the operations of the shrinking apparatus.

In order for the tool holder 12 to be cooled rapidly once it has been heated, the shrinking apparatus comprises a cooling arrangement which is designated 64 in general terms. In the case of the exemplary embodiment shown in FIG. 1, the cooling arrangement 64 comprises a cooling unit 66 which is arranged along the displacement path of the carriage 32, at a distance from the heating unit 48, and has a turret plate 68 on which a plurality of, in this case four, cooling elements 70 coordinated with different tool holders are, or can be, fitted in a manner in which they are distributed in the circumferential direction of the plate. The cooling elements 70 are preferably liquid-cooled and are supplied with liquid coolant from a cooling subassembly, which is illustrated schematically at 71, via flexible tubes or other liquid-channelling means. They have a central through-passage 72 into which the tool holder 12 can be moved, in doing so producing surface-area abutment contact between its accommodating region 18 and the cooling inner circumferential casing of the respective cooling element 70. The cooling elements 70 are, in particular, cooling collars, as are commercially available from Franz Haimer GmbH, under the model designation Power-Clamp, and described in the international patent application with the reference PCT/EP 00/04645 (WO 01/8975811). As far as the actual configuration of these cooling collars is concerned, you are thus referred expressly to the contents of the abovementioned patent application.

The cooling subassembly 71 is expediently designed as a heat-pump subassembly, in the case of which an evaporable, liquid coolant circulates in a heat-pump circuit between a compressor and an evaporator. It is possible for the heat-pump circuit to operate in accordance with the absorber principle or else to comprise a compressor. The cooling elements 70 may be connected to the heat-pump circuit by means of a heat exchanger, via a secondary liquid-coolant circuit. It is expedient, however, for the cooling element 70 which is currently in operation to form the evaporator of the heat-pump circuit directly, which results in a considerable reduction in the dimensions of the cooling subassembly 71.

In a manner analogous to the heating unit 48, the turret plate 68 of the cooling unit 66 is also fitted on a pivoting arm 76 such that it can be rotated about its plate axis 74, said pivoting arm, in turn, being fitted on the base plate 28 such that it can be pivoted about a pivot axis 78, which is parallel to the longitudinal direction of the rails, in an axis-normal plane between a drawn-back position and an advanced position, but, once again, in a stationary manner in the longitudinal direction of the rails. On account of the corresponding turret-plate/pivoting-arm design of the heating unit 48 and cooling unit 66, as far as the movement of the turret plate 68 into various rotary operating positions and the meaning of the pivoting positions of the pivoting arm 76 are concerned, you are referred to what has been said above in the context of the explanation of the heating unit 48, in order to avoid unnecessary repetition. It should also be mentioned, in any case, that, also in the case of the cooling unit 66, the turret plate 68 may be fitted with exchangeable cooling elements 70 and/or the turret plate 68 may be exchangeable as such.

In a preferred configuration, the cooling elements 70 arranged on the turret plate 68 have the same dimensions and the same construction, different sleeve-like adapters being inserted into the cooling elements 70 for adaptation to different tool holder dimensions, and said adapters, on the one hand, being in surface-area abutment contact with the tool holder and, on the other hand, being in surface-area abutment contact with the inner circumference of the cooling element 70. Although, in the exemplary embodiment of FIG. 1, a plurality of cooling elements 70 are combined to form a unit, it is also possible, in a variant, to provide a single cooling element 70, into which heat-conducting adapters of the type explained above can be inserted in a manual or automated manner for adaptation to different tool holders.

It is, moreover, also conceivable to realize a combined heating and cooling arrangement, in the case of which heating elements and cooling elements are arranged on a common support which can be moved in and out of the displacement path of the carriage 32. For example, in the case of the shrinking apparatus from FIG. 1, it is possible for the turret plate 50 and/or the turret plate 68 to be fitted both with induction-heating elements 52 and with cooling elements 70. With induction-heating elements 52 and cooling elements 70 being arranged in a combined manner on a common turret plate, it would even then be possible, in the case of the shrinking apparatus from FIG. 1, for one of the turret plates 50, 68 there to be omitted, which would further simplify the design.

If the movements of the carriage 34 are to be controlled by an electronic control unit, then the latter, in addition to information regarding positioning of the carriages 32 and 34, also have to have information regarding the position, relative to the carriage 34, of the tool 10 positioned on the supporting table 38. In particular, the control unit has to know the location, in a certain axial position of the carriage 34, of the shank end of the tool 10, said end being directed towards the tool holder 12, and/or of that end of the tool 10 which is remote from the shank. This information is necessary in order that the tool shank 22 is introduced precisely, by a desired extent, in the accommodating opening 20 of the tool holder 12. For this purpose, there is mounted on the base plate 28 an optical position-sensing device 80 which, in the illustrated example of FIG. 1, is constructed as a transmitted-light system with a light source 82 and a transmitted-light monitor 84, which is irradiated on the rear side by the light source 82 and on the screen of which crosshairs 86 are superimposed or depicted. The crosshairs 86 are aligned with the tool shank 22 and/or the cutting-edge region of the tool; the monitor 84 may be height-adjustable for adaptation to different tool diameters. At an operating console 88, the user can move the carriage 34 forwards and back, by pushing buttons, until the shank end of the tool 10 is aligned with the vertical line of the crosshairs 86. The user then pushes a corresponding button on the operating console 88, and the axial position assumed at this moment by the carriage 34 is adopted by the control unit as reference for the following control operations on the carriage 34. In this case, the monitor 84 and the light source 82 may be fitted on the base plate 28 in a stationary manner in the longitudinal direction of the rails.

It is alternatively conceivable for the monitor 84 and, if desired, also the light source 82 to be fitted on the base plate such that they can be displaced in the longitudinal direction of the rails, with the result that the position of the shank end of the tool, or that end of the tool which is remote from the shank, can be sensed in that, with the carriage 34 secured, the monitor 84 and, if appropriate, the light source 82 are displaced axially until the crosshairs 86 are moved precisely over the end of the tool.

Instead of a transmitted-light system, it is also possible for the position-sensing device 80 to have, for example, a light barrier or a camera. Any type of camera or image-processing system can be used here. Also suitable is an automatic position-sensing system which can sense the tool position automatically without an operator, for this purpose, having to rely on sight for button-actuated displacement of the carriage 34 or an optical component.

An automatic shrinking operation will be explained by way of example hereinbelow. This requires (as has already been mentioned a number of times) a control unit which controls the various components of the shrinking apparatus and in which a corresponding control program is implemented. It is assumed that the shrinking apparatus shown in FIG. 1 has such a control unit and an operating unit via which an operator can enter parameters of the tool holder and of the tool.

Within the context of this example of the shrinking operation, the operator enters, via the operating unit, the diameter and the length of the tool 10 used, size and length values for the tool holder 12 used and a desired length value for the ensemble comprising the tool holder 12 with tool 10 clamped therein. The length value for the ensemble comprising the tool holder 12 and tool 10 is the value of a length which is measured between the tip of the tool, i.e. that end of the tool which is remote from the shank, and a reference point on the tool holder. This reference point may be formed for example—looking at FIG. 6—on that axial side of an annular flange 87 of the tool holder 12, formed between the coupling flange 14 and the accommodating region 18, which is in the vicinity of the tool or also on that axial side of said annular flange 87 which is remote from the tool. It goes without saying that any other location of the tool holder 12 which defines a reproducible axial position in relation to the holder mount of the machine-tool spindle is suitable as the reference point. In particular in the case of steep-taper tool holders, it has become customary to define the reference point by an axial position in which the conical coupling flange 14 has a predetermined diameter.

Irrespective of where the reference point is located on the tool holder 12, the term overall length will be used hereinbelow for the length of the unit comprising the tool holder 12 and tool 10 which is measured between the tip of the tool and said reference point. Once the parameter values specified above have been entered, the operator introduces the tool holder 12 into the opening of the accommodating body 26 of the accommodating unit 24 and actuates a corresponding button on the operating unit, whereupon suitable retaining means in the accommodating unit 24 are activated and grip the tool holder 12. Furthermore, the operator positions the tool 10 on the supporting table 38 and carries out the procedure explained above of sensing the tool position with the aid of the position-sensing device 80.

The operator then pushes a start button on the operating unit. The supporting table 38 then moves into a vertical position corresponding to the tool diameter entered, and the turret plate 50 rotates into a rotary operating position in which an induction-heating element 52 which is appropriate for the size of the tool holder 12 entered comes into alignment with the tool holder 12 when the pivoting arm 58 is pivoted in. The pivoting arm 58 pivots forwards and thus brings the relevant induction-heating element 52 into alignment with the tool holder 12. The carriage 32 then moves axially, out of its starting position shown in FIG. 1, up to the pivoted-in turret plate 48 and introduces the tool holder 12, by way of its accommodating region 18, into the relevant induction-heating element 52. The control unit then produces, in the induction coil of said induction-heating element 52, a flow of current with an intensity and/or frequency and/or duration dependent on the size of the tool holder 12. The second carriage 34 with the tool 10 located on the supporting table 38 moves, out of its starting position shown in FIG. 1, up to the turret plate 50, the tool shank 22 penetrating into the accommodating opening 20 of the tool holder 12, said opening being widened as a result of the inductive heating. The tool holder is still located in the induction-heating element 52 even if the flow of current in the latter is then switched off. The carriage 34 moves the tool 10 into the accommodating opening 20 of the tool holder 12 until the extent which has been predetermined by the user for the overall length of the unit comprising the tool holder 12 and tool 10 has been reached. The depth to which the tool 10 has to penetrate into the tool holder 12 here is calculated by the control unit from the entered information represented by the values for the tool length and the desired overall length as well as the length of the tool holder in relation to the reference point.

As soon as the accommodating region 18 of the tool holder 12 has narrowed again to the extent where the tool 10 is seated in a fixed manner therein (this may be the case just after the flow of current in the induction coil has been switched off), the carriage 34 moves back into its starting position. The carriage 32 also moves back, if not necessarily into its starting position, then still far enough for the tool holder 12 with the tool 10 to be moved out of the interior 54 of the induction-heating element 52 and for it to be possible for the turret plate 50 to be moved past the tip of the tool. The pivoting arm 58 then pivots back.

The turret plate 68 of the cooling unit 66 then rotates into such a rotary operating position in which a cooling element 70 which is appropriate for the size of the tool holder 12 entered comes into alignment with the tool holder 12 when the pivoting arm 76 is pivoted in. The pivoting arm 76 pivots forwards and thus brings the relevant cooling element 70 into alignment with the tool holder 12. The carriage 32 then moves up to the pivoted-in turret plate 68 and introduces the still hot tool holder 12, with the tool 10 in front, into the relevant cooling element 70.

Once the tool holder 12 has been cooled, the carriage 32 moves back into its starting position, and the pivoting arm 76, with the turret plate 68, pivots back. Pushing a button on the operating unit causes the retaining means to release the tool holder 12, with the result that the latter can be removed from the accommodating unit 24.

Once the tool 10 has been shrink-fitted into the tool holder 12 and the cooling phase by means of the cooling arrangement 64 has been completed, the overall length of the unit comprising the tool holder 12 and tool 10 is preferably measured again, the overall length—as has been explained above—being understood as the axial distance between the tip of the tool and the predetermined reference point thereof on the tool holder 12. The overall length can be measured, for example, by both the tip of the tool and the reference point of the tool holder 12 being sensed one after the other by means of the position-sensing device 80 or by the tip of the tool being moved against a measuring stop with a known axial position and merely the reference point of the tool holder 12 being sensed by means of the position-sensing device 80. The procedures of measuring the overall length and, if appropriate, then releasing the tool 10 and shrink-fitting it again can take place, in particular, fully automatically without the intervention of operating staff if a control unit which controls the operation of the shrinking apparatus is programmed correspondingly.

In order to release a tool 10 from the tool holder 12, the tool holder 12 is moved into one of the induction-heating elements 52 of the heating unit 48 and heated therein. It is then possible either for the tool 10 to be drawn out of the tool holder 12 through the relevant induction-heating element 52 or for the heated and expanded tool holder 12 to be moved out of the induction-heating element 52 together with the tool 10 and then for the tool 10 to be removed. For cooling purposes, the tool holder 12 is then also moved alone into one of the cooling elements 70 of the cooling unit 66.

In the case of a straightforward embodiment, an operator may have the task of manually inserting the tool holder 12 into the accommodating unit 24 and removing it therefrom. It may likewise be the case that the operator also has to position the tool 10 manually on the supporting table 38 and remove it manually from the tool holder 12 for release purposes.

If, in contrast, the attempt is made to automate the operation of the shrinking apparatus as far as possible, it is possible to provide an automatic feeding and removal system by means of which tool holders 12 which are empty, or are fitted with a tool, can be fed to the accommodating unit 24 and inserted therein and, conversely, the tool holders 12 can also be removed from the accommodating unit 24 again. It will expediently be possible, at the same time, for such a feeding and removal system to feed tools 10 automatically to the positioning/mounting unit 36 and remove them automatically therefrom and transport released tools away automatically. For example, it is possible for the feeding and removal system to remove the empty tool holders, and the tools which are to be clamped in, from a magazine where a multiplicity of identical and/or different tool holders and tools are kept in stock. If tool holders have been fitted with a tool in the shrinking apparatus, then the feeding and removal system can deposit these fitted-out tool holders, for example, at a transfer location, from where the operating staff can pass them on for further use.

In order to realize an automatic feeding and removal system, it is possible to use, for example, a handling robot which is indicated at 89 in FIG. 1 and can grip and convey the tool holders and/or tools by way of one or more gripping arms 91. Instead of using a robotic gripping system, it is also possible for the feeding and removal to take place, for example, by way of a belt-like or chain-like conveying means on which there are fitted pockets or other mounts in which the tool holders and/or tools are inserted. Also conceivable, for example, are solutions with a turntable.

The shrinking apparatus according to the invention may be extended by a balancing function, by means of which it is possible to measure any possible unbalance of the tool holder and to compensate for this by fitting balance weights. For this purpose, in the case of the exemplary embodiment of FIG. 1, the carriage 32 is configured as a headstock in which a spindle 90, which is indicated by dashed lines, is mounted equiaxially in relation to the tool holder axis 16 such that it can be rotated about its spindle axis 92. The spindle 90, which is configured in particular as a hollow spindle, is coupled in a rotationally fixed manner to the accommodating unit 24, with the result that, when the spindle 90 rotates, the tool holder 12, which is clamped in a rotationally fixed manner in the accommodating unit 24, rotates along with it. Also indicated by dashed lines is an electric drive motor 94, which is likewise accommodated in the headstock 32 and serves for driving the spindle 90 in rotation. A force-sensor arrangement 96 senses unbalance forces which act on the spindle 90 as it rotates. From the signals emitted by the force-sensor arrangement 96, an electronic evaluating unit (not illustrated specifically) determines the magnitude and direction of the unbalance of the tool holder 12 and shows the corresponding information on a display (which is likewise not illustrated specifically).

In order to extend the shrinking apparatus into a combined balancing/shrinking apparatus, technical details as are described in WO 00/45983 and/or DE 199 61 451 A1 may be realized in the headstock 32 in particular. The contents of these two prior publications are thus expressly incorporated and regarded as part of the present disclosure.

It is frequently desired for the tool to be shrink-fitted into the tool holder such that the overall length of the tool holder has a predetermined value. For this purpose, a fair number of tool holders have a pre-setting screw 98 (see FIG. 6) which is arranged in the accommodating opening of the tool holders, forms an axially adjustable stop for the shank of the tool which is to be clamped in and, during the shrink-fitting procedure, defines the depth to which the tool shank penetrates in the accommodating opening of the tool holder. The pre-setting screw 98 can be adjusted axially by being turned by a screwing-action tool, usually a hexagon-socket wrench, which is normally introduced into the accommodating opening from the tool end of the tool holder.

In the case of the shrinking apparatus from FIG. 1, such a screwing-action tool is retained on a pivoting arm 100 which is mounted on the base plate 28 along the displacement path of the headstock 32 such that it can be pivoted about a pivot axis 102 parallel to the longitudinal direction of the rails, preferably with the aid of a motor drive. The pivoting arm 100 is fitted on the base plate 28 in a stationary manner in the longitudinal direction of the rails. Of course, this does not rule out the possibility of the pivoting arm being adjusted axially. On the pivoting arm 100, the screwing-action tool (designated 104 here) can be pivoted from a position in which it is located outside the displacement path of the headstock 32, and the headstock 32 can thus be moved past the screwing-action tool 104 and the pivoting arm 100 without obstruction, into a position in which it is aligned with the pre-setting screw 98 of the tool holder 12. For adjusting the pre-setting screw 98, it is sufficient for the headstock 32 to move axially up to the screwing-action tool 104, with the result that the latter comes into engagement with the pre-setting screw 98, and then the drive motor 94 is activated in the desired direction of rotation. The pre-setting screw 98 is prevented by the screwing-action tool 104 from rotating along with the tool holder 12, and is thus displaced axially in the tool holder 12. In order for it to be possible to follow the axial movement of the pre-setting screw 98, the screwing-action tool 104 is prestressed in the direction of the pre-setting screw 98 by a prestressing spring 106. This ensures that, despite the pivoting arm 100 being stationary, the engagement between the pre-setting screw 98 and the screwing-action tool 104 is not lost. It goes without saying that, if appropriate, it is also possible for the screwing-action tool 104 to be driven in rotation by an additional motor. If appropriate with the aid of the position-sensing device 80, it is possible for the pre-setting screw 98 to be set to a desired axial position relative to the predetermined reference point of the tool holder 12 or of some other surface of the tool holder 12 which is in a defined position relative to the predetermined reference point.

Different tool holders 12 may have different pre-setting screws 98 which differ from one another by the size and/or shape of their engagement formations for the screwing-action tool, in the case of hexagon-socket screws, for example, by the diameter of their hexagon-socket opening. Different tool holders 12 may thus require different screwing-action tools 104. In this respect, it is possible for the screwing-action tool 104 to be accommodated in a retaining head 107, arranged at the free end of the pivoting arm 100, such that it can be exchanged for operational purposes and to be exchangeable, if required, for another screwing-action tool. It is also possible, however, for the retaining head 107 to be fitted, in the manner of a turret, with a plurality of screwing-connection tools which can optionally be brought into use. A further possibility is to use a screwing-action tool 104 which is configured such that it is suitable for actuating pre-setting screws 98 with engagement formations of different sizes, for example hexagon-socket openings of different sizes.

In order to ensure precise adjustment of the pre-setting screw 98 of the tool holder 12, it should advantageously be possible for the adjustment path of the pre-setting screw 98 to be measured when the latter is adjusted by means of the screwing-action tool 104.

For this purpose, the screwing-action tool 104 may be assigned, on the retaining head 107, a length-measuring system by means of which it is possible to measure the axial deflection of the screwing-action tool 104 during adjustment of the pre-setting screw 98. This deflection of the screwing-action tool 104 corresponds to the adjustment path of the pre-setting screw 98.

It has been assumed up until now that the adjustment of the pre-setting screw 98 takes place from the right-hand side of the tool holder 12 in FIG. 1, that is to say, as it were, from the front. However, it is also possible, in principle, for the pre-setting screw 98 to be adjustable from the side of the coupling shank 14 of the tool holder 12, as it were from the rear. In such a case, the pivoting arm 100 with the retaining head 107 may be fitted on the supporting base 28 behind the carriage 32. In order then for it to be possible to measure the displacement path of the pre-setting screw 98, a sensor (not illustrated specifically) can extend into the accommodating opening 20 of the tool holder 12 from the front and sense the axial position of the pre-setting screw 98. Such a sensor may be fitted on the carriage 32 or on the supporting base 28.

Figure 2:
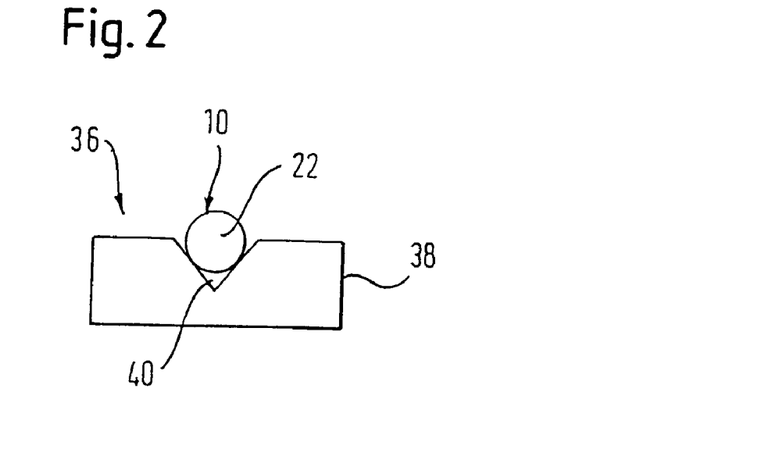
FIG. 2 shows, schematically, a section through a supporting channel for a tool which is to be clamped in, in the case of the shrinking apparatus from FIG. 1.
Figure 3:
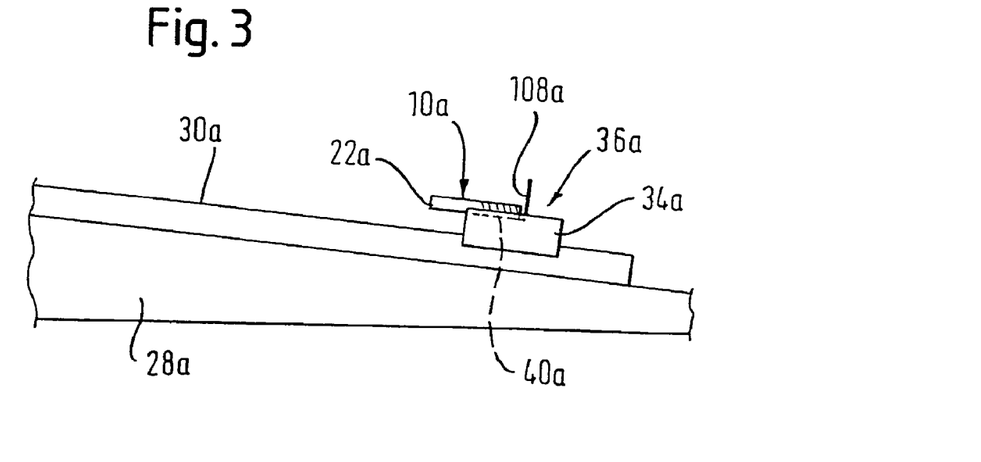
FIG. 3 shows, schematically, a modification of the shrinking apparatus from FIG. 1.
Figure 4:
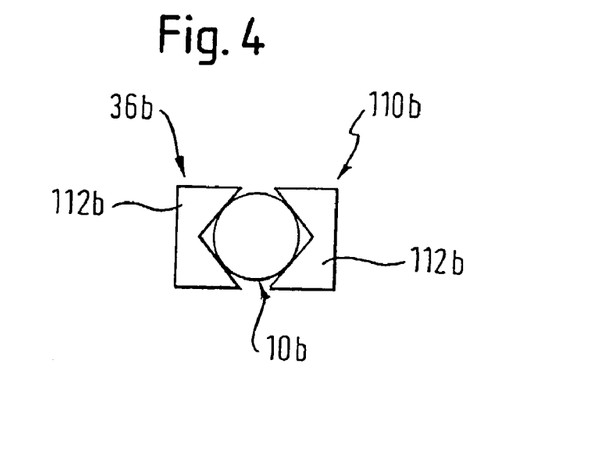
Figure 5:
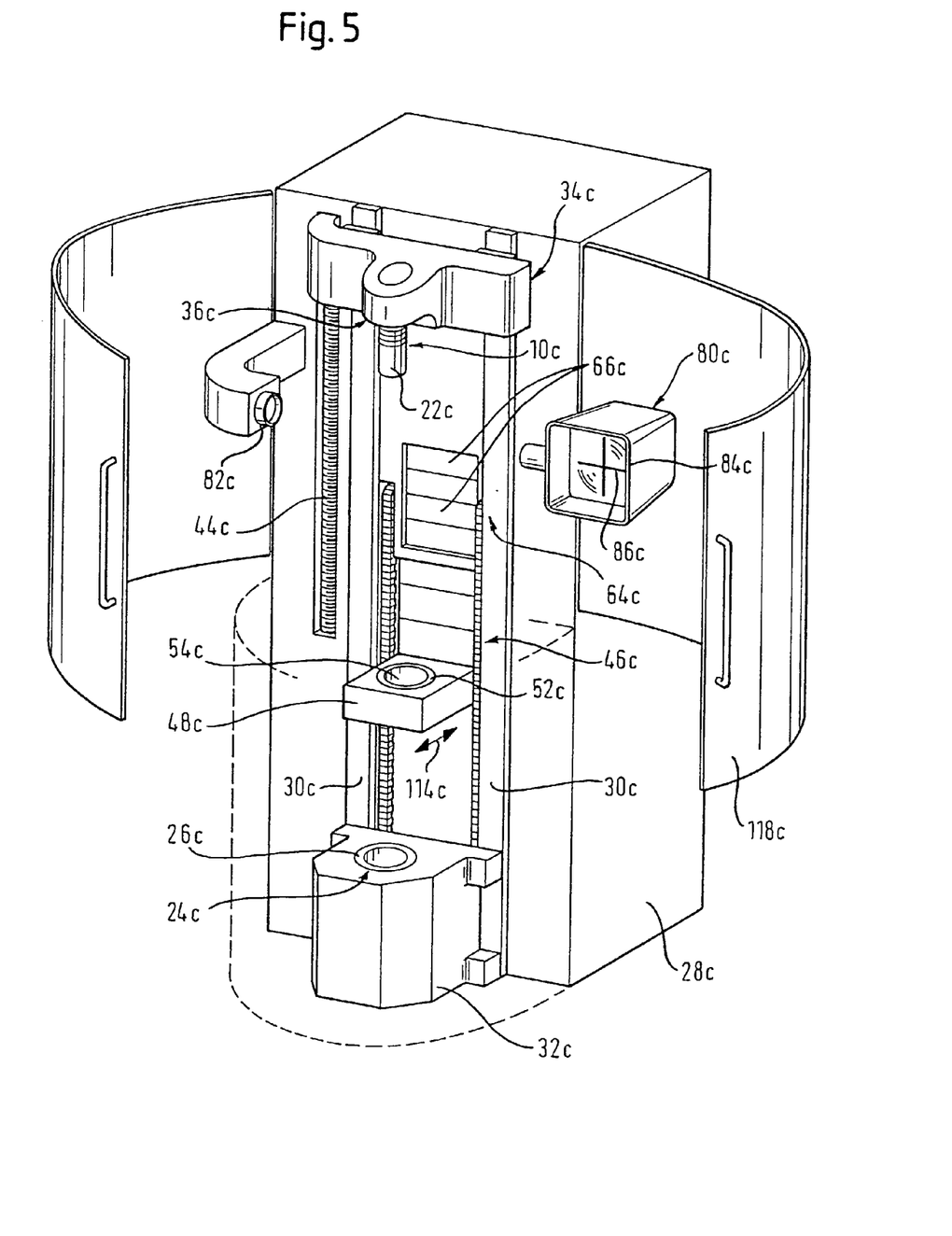
FIG. 5 shows a schematic view, in perspective, of a shrinking apparatus according to the invention configured as a vertical unit.

In the case of the following explanation of FIGS. 3 to 5, components which are the same as, or equivalent to, those dealt with before are designated the same as in FIGS. 1, 2 and 6, although a lower-case letter is attached in order to distinguish them. For an explanation of these components, unless anything is stated to the contrary hereinbelow, you are referred to what has been said above.

FIG. 3 shows a variant with a rail system 30a which runs obliquely, at a small acute angle, to the horizontal, the rail system 30a sloping down in the direction of the carriage 34a. The slope of the rail system 30a may cause the tool 10a to slide down in the supporting channel 40a once it has been positioned therein. In order to prevent it from sliding back too far, it is possible to provide a positioning stop 108a which can position the tool 10a axially. Moreover, it is also possible for such a positioning stop to be provided in the case of a horizontal shrinking apparatus, as is illustrated in FIG. 1.

In the case of the shrinking apparatus from FIG. 1, providing a fixed positioning stop on the carriage 34 additionally makes it possible to measure the length of the tool 10, by the latter being positioned, by way of its tip remote from the shank, against the positioning stop and the shank end being sensed by means of the position-sensing device 80. It is then not necessary for the length of the tool 10 to be entered manually into an operating unit by an operator; rather, the shrinking apparatus can measure the length of the tool 10 automatically.

As an alternative to positioning the tool loosely in a positioning channel which is open at the top, FIG. 4 shows an example of a clamping mount 100b with two prismatic clamping jaws 112b which can clamp the tool 10b in radially between them from opposite sides. It goes without saying that the clamping jaws 112b, alternatively, may also have rounded jaw surfaces, and that the clamping mount 10b, if desired, may also have more than two clamping jaws, for example three or four clamping jaws, acting on the tool 10b from different sides. It likewise goes without saying that such a clamping mount with clamping jaws can be used, in principle, in the case of shrinking apparatuses with the rail system oriented in any desired manner.

Finally, FIG. 5 shows a variant in the case of which the shrinking apparatus is configured as a vertical unit, with the carriage 34c at the top and the carriage 32c at the bottom, and the guide rails 30c, accordingly, run vertically. In contrast to the shrinking apparatus from FIG. 1, in the case of this exemplary embodiment, the heating arrangement 46c comprises a group of heating units 48c which are arranged one behind the other in the axial direction or in the longitudinal direction of the rails and are each fitted with just a single induction-heating element 52c. These heating units 48c, of which four are provided in the example of FIG. 5, but may also be present, in principle, in any other desired number (even one), are configured as sliding elements which are arranged on the supporting base 28c such that they can be displaced in a rectilinear manner orthogonally to the longitudinal direction of the rails, as indicated by a double arrow 114c.

The supporting base 28c may form an accommodating housing for the heating units 48c, from which the heating units 48c can be extended in the manner of drawers when they are required for heating the tool holder and into which they are retracted in a protected manner when they are no longer required. In this extended position, the heating units 48c are moved into the displacement path of the carriage 32c to the extent where the tool holder can move into the respective induction-heating element 52c. In their retracted position, the heating units 48c are moved out of the displacement path of the carriage 32c to the extent where the carriage 32c can move past the respective heating unit 48c without obstruction. In order for it to be possible to automate the operation of the shrinking apparatus, each of the heating units 48c is preferably assigned a dedicated drive motor, by means of which the respective heating unit 48c can be displaced independently of the other heating units 48c. In a manner analogous to the heating arrangement 46c, the cooling arrangement 64c also comprises a group of in this case four cooling units 66c, which are arranged axially one behind the other, are likewise designed as sliding elements and are each fitted with a single cooling element. The group of heating units 48c and the group of cooling units 66c are arranged one behind the other in the longitudinal direction of the rails, although it is, of course, alternatively conceivable for them to be arranged opposite one another on both sides of the displacement path of the carriage 32c.

The positioning mount 36c for the tool 10c may be designed, for example, as a clamping mount, as has been explained above in relation to FIG. 4. Also conceivable for mounting the tool 10c, for example, is a longitudinally slit sleeve into which the tool 10c can be inserted. Any other desired clamping arrangements, however, are also possible.

The following should be added to all the exemplary embodiments which have been explained above. The positioning/mounting unit 36, 36a, 36b or 36c, which serves for positioning the tool, may be mounted in a floating manner in at least one radial direction, with the result that it can be moved radially in a certain region. This makes it possible to compensate for any alignment errors which may arise between the tool shank and the tool holder when the former is introduced into the latter. For example, it is possible for the positioning/mounting unit to be elastically deflectable counter to a spring force which centres it radially.

The above has been based on an optical position-sensing system always being used for sensing the position and, if appropriate, measuring the length of the tool. Of course, instead of an optical position-sensing system, it is also possible to realize a mechanical position-sensing system. Looking at the shrinking apparatus from FIG. 1, it is possible for a mechanical sensor (not illustrated specifically) to be fitted, for example, on the retaining head 107 axially opposite the screwing-connection tool 104. For sensing the position of the tool 10, the pivoting arm 100 is pivoted in and the carriage 34 with the tool 10 is moved up to the sensor. The sensor may be configured with a long measuring range of, for example, approximately 30 mm. In this case, there is no need for the tool 10 to be moved right up to the sensor. It only has to deflect the sensor by a desired amount. From the amount of deflection of the sensor, it is then possible to determine the axial position of the shank end side of the tool 10 and to calculate the length of the tool 10 therefrom. It goes without saying that, in the case of the position of the tool 10 being sensed mechanically in this way, the tool will be secured against sliding axially, at least in the direction away from the tool holder 12, by means of an axial positioning stop or suitable clamping means.

It has further been assumed up until now that the shrinking apparatus, for adaptation to different sizes of tool holder, is fitted with different sizes of induction-heating element and different sizes of cooling element. Of course, it is also conceivable to use an induction-heating element, and a cooling element, of changeable size. Changeable size here means that the diameter of the central interior of the induction-heating element or of the cooling element can be adapted to the size of the respective tool holder. It is conceivable, in particular, for it to be possible for the size of the induction-heating element and of the cooling element to be adapted automatically by a suitable actuating means, although manual size adaptation is not ruled out. Using such temperature-controlling elements of adaptable size makes it possible to realize a shrinking apparatus which manages with a single induction-heating element and a single cooling element and nevertheless has a wide range of use.

In FIG. 1, cooling water or some other liquid coolant can flow around the spindle 90 in order to keep it at a constant temperature. This makes it possible to achieve the situation where, following a number of successive shrinking operations, the spindle 90 does not heat up or influence the length measurement of the unit comprising the tool holder 12 and shrink-fitted tool 10 as a result of thermal expansion.

A monitoring function for the temperature of the tool holder may also be implemented in the shrinking apparatus according to the invention. Indicated, for this purpose, in FIG. 1 is a temperature sensor 114 which is retained on the carriage 32 via a support arm 116 and measures the temperature of the region of the accommodating opening 20 of the tool holder 12. The temperature sensor 114 may be, for example, an optical temperature sensor or a contact measuring sensor. It transmits its sensor signal to an electronic control unit (not illustrated specifically) of the shrinking apparatus. In order to prevent the operating staff from sustaining burns as a result of contact with hot parts, the control unit may be programmed in order to give a predetermined warning and/or protective reaction as long as the temperature of the tool holder 12 is above a predetermined temperature threshold. It is thus only possible for the control unit, for example, to allow a protective hood, indicated at 118c in FIG. 5, to be opened when the temperature of the tool holder 12 has fallen below the temperature threshold. Alternatively, or in addition, the control unit can emit an optical and/or acoustic warning signal if the temperature of the tool holder 12 is still above the temperature threshold. Alternatively, or in addition, it is possible for the control unit to emit an optical and/or acoustic release signal when the temperature of the tool holder 12 has dropped below the temperature threshold.

For measuring the length of the unit comprising the tool holder 12 and shrink-fitted tool 10, it is important to find out the overall length of this unit in the cold state. It may take too much time, however, for the user to wait to measure the overall length of this unit until the tool holder has completely cooled to ambient temperature. The sensing of the temperature of the tool holder 12 by means of the temperature sensor 14, then, makes it possible to avoid such a long wait. This is because, if the temperature of the tool holder 12 is known, it is possible to compensate computationally, in the length measurement, for the heating-induced length expansion of the tool holder 12, with the result that the measurement of the unit comprising the tool holder 12 and tool 10 can take place when the tool holder 12 is still warm and expanded in relation to its cold state.

In order always to achieve the same length expansion in the case of different shrinking operations on equivalent tool holders 12, it is possible, furthermore, to monitor the shrinking operation. For example, each shrinking operation can be carried out using the same quantity of energy. For this purpose, it is possible, for example, for the temperature of the tool holder 12 to be monitored permanently and for the power supply to the induction coil used for heating the tool holder 12 to be controlled in dependence on the sensed temperature of the tool holder 12.

It is desirable for that end of the tool 10 which is remote from the shank to have a predetermined position, in the cold state of the tool holder, relative to the abovementioned predetermined reference point of the tool holder 12. The deviation tolerances here should be as small as possible. The reference point is usually located on the side of the coupling shank 14 of the tool holder and is thus only indirectly accessible for measurements during the shrinking operation, while the sleeve-like tool-accommodating region 18, which is accessible for direct measurements, not only widens, but also lengthens axially, during the thermal-expansion phase. If surfaces in this region are used for length-measuring purposes during the thermal-expansion phase, then this results in comparatively large measurement tolerances, even if the attempt is made to correct the axial thermal expansion computationally.

If the tool holder 12 has a pre-setting screw 98, as has been explained above with reference to FIG. 6, then it is possible to adjust the position of the pre-setting screw 98 prior to the thermal-expansion phase, i.e. with the tool holder 12 in the cold state, in accordance with the length of the cold tool 10. The tolerances of the shrink-fitted tool relative to the reference point of the tool holder 12 are thus not influenced by thermal-expansion errors. However, this pre-setting method requires tool holders with a pre-setting screw, and the pre-setting operation also involves comparatively high outlay since the pre-setting screw 98, which is located within the tool holder 12, has to be adjusted and measured.

Figure 7:
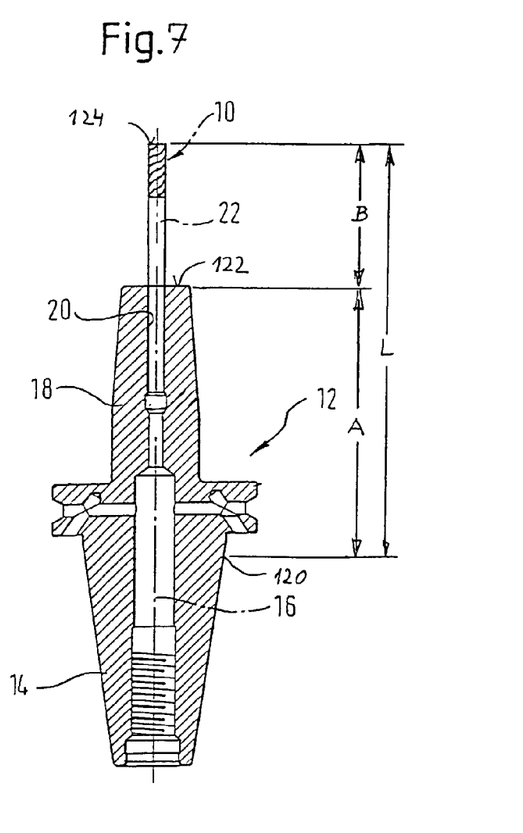
FIG. 7 shows an axial longitudinal section through a further tool holder for the purpose of explaining a method for pre-setting the overall length of the tool holder, it being possible for said method to be used for shrinking apparatuses according to the invention and also for other shrinking apparatuses.

The pre-setting screw 98 of the tool holder 12, however, may be dispensed with, or need no longer be adjusted, if the tool 10, as is explained with reference to FIG. 7, is shrink-fitted into the tool holder 10 in position. FIG. 7 shows a tool holder which has an axial length extent A between its predetermined reference point 120, in this case defined by a predetermined diameter of the coupling shank 14, and its axis-normal end surface 122 at the tool end of its accommodating region 18, containing the accommodating opening 20, in the cold state. In order to shrink-fit the tool 10 into the tool holder 12 so as to result in a predetermined overall length L between the reference point 120 and the tip of the tool 124 in the cold state, the tip of the tool 124 has to be spaced apart from the end surface 122 by an axial distance B in the cold state. The length B may also be measured with small tolerances during the thermal-expansion phase of the shrink-fitting procedure since, during the thermal-expansion phase, the length A does indeed change, by the end surface 122 moving axially relative to the reference point 120, but the absolute extent of the length B does not, provided this extent is determined from the thermally expanded position of the end surface 122. The extent of the length B can be calculated from the desired overall length L minus the length extent A which can be measured on the cold tool holder 12 and, during the thermal-expansion phase of the shrink-fitting operation, can be utilized for controlling the push-in length for introducing the tool shank 22 into the accommodating opening 20.

In a preferred configuration of the shrink-fitting arrangements explained above, it is provided that the position-sensing device 80 monitors the extent B, during the thermal-expansion phase, in relation to the thermally extended axial position of the end surface 122. Once the current, thermally expanded position of the end surface 122 has been determined, the tool 10 is introduced into the accommodating opening 20, by means of the carriage 34, until the tip of the tool 124 is spaced apart from the end surface 122 by the distance B. During the pushing-in movement, the position-sensing device can monitor the current position of the tip of the tool 124 or else, if the carriage 34 is moved by means of a regulated positioning drive, then the control means of this positioning drive can set the carriage 34 to the extent B relative to the thermally expanded position of the end surface 122 determined by the position-sensing device 80 in relation to the base 28.

In order for it to be possible to carry out the setting process explained above, it is sufficient if the tool holder 12 and the tool 10 can be moved relative to one another. For this purpose, it is not necessary, as has been explained above, for both the tool holder 12 to be movable on a carriage 32 and the tool 10 to be movable by means of a carriage 34; it is sufficient if one of these components is retained on a carriage. The relative-advancement movement can be carried out manually with simultaneous monitoring by a length-measuring means; it can also be carried out in an automated manner by positioning drives. The pre-setting method may thus also be used in the case of shrinking apparatuses other than those according to the invention which have been explained above. The position-sensing device may be designed as has been explained above, although mechanically sensing length-measuring means are also suitable. In its simplest form, the positioning/mounting unit need not necessarily retain the rotary tool in a fixed manner. It is sufficient if the positioning/mounting unit has an axial stop, for the tip of the tool 124, which can be set to the extent B relative to the thermally expanded end surface 122, with the result that the tool 10 is drawn, if appropriate manually, against said stop following insertion into the accommodating opening 20. It is also possible for the setting of the stop to the extent B to take place manually during the shrink-fitting procedure, if appropriate with the aid of a conventional length-measuring means.

The invention claimed is:

1. Shrinking arrangement for a tool holder which retains a rotary tool with a press fit in a central accommodating opening, comprising:
a rail system fastened to a supporting base;
a carriage coupled to the rail system;
an accommodating unit, arranged on the carriage, for accommodating the tool holder such that an axis of the tool holder is substantially parallel to a longitudinal direction of the rail system;
a mounting unit for mounting the rotary tool coaxially with the axis of the tool holder;
a positioning drive for moving the carriage and the mounting unit relative to each other in the longitudinal direction of the rail system; and
a temperature-controlling arrangement for the thermal expansion and for the subsequent cooling of the tool holder in the region of the accommodating opening, the temperature-controlling arrangement including a cooling unit and a transversely-displaceable heating unit,
wherein the carriage follows a displacement path into a region of action of the temperature-controlling arrangement, and
wherein the heating unit is transversely-displaced, relative to the displacement path, when the carriage is within the region of action of the cooling unit.

2. Arrangement according to claim 1, wherein the carriage occupies different axial positions along the rail system for heating and for cooling the tool holder.

3. Arrangement according to claim 1, wherein the heating unit is arranged on the supporting base and is transversely-displaceable, in an orthogonal plane to the longitudinal direction of the rail system, between at least one advanced position, in which the heating unit has been moved into the displacement path of the carriage and in which the tool holder occupies a through-passage opening of a temperature-controlling element of the heating unit, and a drawn-back position, in which the heating unit has been moved out of the displacement path of the carriage.

4. Arrangement according to claim 3, wherein the temperature-controlling element has an induction coil which, for heating purposes, encloses the region of the accommodating opening of the tool holder in an annular manner, at a radial distance therefrom.

5. Arrangement according to claim 3, wherein the temperature-controlling element has a cooling collar, through which liquid coolant flows, positioned on the tool holder and in contact therewith, for cooling purposes.

6. Arrangement according to claim 3, wherein the temperature-controlling arrangement is fitted on the supporting base in a stationary manner with respect to the longitudinal direction of the rails.

7. Arrangement according to claim 3, wherein the heating unit is linearly guided, at least in part, between the drawn-back position and the advanced position.

8. Arrangement according to claim 3, wherein the cooling unit is arranged on the supporting base and is transversely-displaceable, in an orthogonal plane to the longitudinal direction of the rail system, between at least one advanced position, in which the cooling unit has been moved into the displacement path of the carriage and in which the tool holder occupies a through-passage opening of a temperature-controlling element of the cooling unit, and a drawn-back position, in which the cooling unit has been moved out of the displacement path of the carriage.

9. Arrangement according to claim 8, wherein the cooling unit is linearly guided, at least in part, between the drawn-back position and the advanced position.

* * * * *